(12) United States Patent
Nieuwoudt

(10) Patent No.: US 7,905,937 B2
(45) Date of Patent: Mar. 15, 2011

(54) TWO-STAGE MIST ELIMINATOR AND METHOD

(75) Inventor: Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 166 days.

(21) Appl. No.: 12/205,131

(22) Filed: Sep. 5, 2008

(65) Prior Publication Data

US 2009/0071337 A1 Mar. 19, 2009

Related U.S. Application Data

(60) Provisional application No. 60/971,960, filed on Sep. 13, 2007.

(51) Int. Cl.
*B01D 45/00* (2006.01)
(52) U.S. Cl. ........... 55/444; 55/440; 55/442; 55/443; 55/445; 55/416; 55/464; 55/465; 55/DIG. 14; 96/356; 96/358; 96/360; 96/188; 96/190
(58) Field of Classification Search ............ 55/440, 55/442–445, 464–465, DIG. 14, 416; 96/356, 96/358, 360, 188–190
See application file for complete search history.

(56) References Cited

U.S. PATENT DOCUMENTS

| | | | | |
|---|---|---|---|---|
| 3,315,445 A * | 4/1967 | De Seversky | | 96/53 |
| 3,518,816 A * | 7/1970 | Jalma | | 96/326 |
| 3,616,623 A * | 11/1971 | Reid | | 55/440 |
| 3,870,488 A * | 3/1975 | Arndt et al. | | 55/440 |
| 4,198,215 A | 4/1980 | Regehr | | |
| 4,204,847 A * | 5/1980 | Ko | | 96/356 |
| 4,322,234 A * | 3/1982 | Mock | | 55/440 |
| 5,203,894 A * | 4/1993 | Chowaniec | | 55/440 |
| 5,230,725 A * | 7/1993 | Chowaniec | | 55/440 |
| 5,269,823 A | 12/1993 | Wurz | | |
| 5,316,568 A * | 5/1994 | Brown | | 95/31 |
| 5,464,459 A | 11/1995 | VanBuskirk et al. | | |
| 5,749,930 A | 5/1998 | Wolf et al. | | |
| 5,985,004 A * | 11/1999 | Boyd | | 95/241 |
| 6,000,685 A * | 12/1999 | Groten et al. | | 261/112.2 |
| 6,083,302 A * | 7/2000 | Bauver et al. | | 95/216 |
| 7,424,999 B2 * | 9/2008 | Xu et al. | | 261/97 |
| 2007/0137154 A1 * | 6/2007 | Agnello et al. | | 55/440 |
| 2007/0144121 A1 * | 6/2007 | Allan | | 55/444 |
| 2008/0168753 A1 * | 7/2008 | Christiansen et al. | | 55/440 |

FOREIGN PATENT DOCUMENTS

DE 202005002674 U1 5/2005
DE 202007001942 U1 9/2007

* cited by examiner

*Primary Examiner* — Jason M Greene
*Assistant Examiner* — Dung Bui
(74) *Attorney, Agent, or Firm* — Hovey Williams LLP

(57) ABSTRACT

A two-stage blade-type mist eliminator is provided. In general, both stages include a plurality of impingement blades arranged to form a vaulted or inverted V-shaped profile. The first stage defines a larger included angle than the second stage. Advantageously, the corresponding terminal ends of each stage can be supported by a common support member.

20 Claims, 3 Drawing Sheets

TWO-STAGE MIST ELIMINATOR AND METHOD

BACKGROUND OF THE INVENTION

The present invention relates generally to an apparatus and method for the removal of entrained liquid from vapor streams. More specifically, the present invention relates to two-stage, chevron vane-type mist eliminators and methods of using same to remove liquid droplets from vapor streams.

Mist eliminators are commonly used in vessels such as distillation towers, knockout drums, or other process apparatuses to remove entrained or suspended liquid droplets or mist from vapor streams flowing within the vessels. Mist eliminators can be employed in a wide variety of vapor-liquid separation applications. For example, they are used to remove pollutants or other contaminants from flue gas streams and to separate a desirable liquid from a vapor stream in a distillation column.

Mist eliminators conventionally take a variety of forms such as rod banks, mesh pads, and vanes. Vane-type mist eliminators employ a plurality of plates or blades that are positioned in spaced-apart and side-by-side relationship to form multiple vapor flow paths in the spacing between adjacent blades. The blades typically are identically constructed and have multiple angled surfaces, such as a chevron-profile, that create repeated tight bends in the vapor flow paths. As the vapor stream navigates these bends, the inertia or momentum of the liquid droplets in the vapor stream causes the liquid droplets to impinge against and adhere to the blade surfaces. The small droplets then coalesce into larger droplets that then drain downwardly along the blades under the influence of gravity. In this manner, some portion of the liquid droplets is removed from the vapor stream.

In applications where the vapor stream carries a heavy liquid load or where a high degree of liquid removal from the vapor stream is desired, it is known to use a two-stage vane-type mist eliminator to increase the liquid-removal capacity of the mist eliminator. In one embodiment of such a two-stage mist eliminator, the upstream stage is linear and extends horizontally or perpendicular to the direction of vapor stream flow. The blades in the downstream stage are arranged to form a V-shaped profile having an apex pointing in the direction of the vapor stream flow. The resulting triangular-shaped configuration is advantageous in that the linear upstream stage removes a portion of the liquid droplets before the vapor stream encounters the V-shaped downstream stage, thereby increasing the capacity and efficiency of the mist eliminator in comparison to many single-stage mist eliminators. The sloping profile of the V-shaped downstream stage is also advantageous in that it allows coalesced liquid to readily drain from the blades by following the slope of the blades. This advantage, however, is somewhat offset by the relatively less efficient drainage of liquid from the horizontally oriented blades in the underlying upstream stage of the mist eliminator, which can result in flooding of the upstream stage and reentrainment of the coalesced liquid into the vapor stream. The capacity and efficiency of this type of two-stage mist eliminator is thus limited by the performance of the horizontally oriented upstream stage.

Examples of two-stage mist eliminators which partially overcome the disadvantages of the triangular two-stage mist eliminators discussed above are disclosed in U.S. Pat. No. 5,749,930. In that patent, the blades in each stage are arranged to form identical V-shaped profiles. In one embodiment, the stages are arranged so that the apexes of their V-shaped profiles point toward each other. In another disclosed embodiment, the apexes point away from each other. This latter embodiment is advantageous because it allows the paired stages to be mounted to common beams. In yet another embodiment described as being in the prior art, the apexes of both stages point in the direction of vapor flow.

A disadvantage common to the embodiments disclosed in U.S. Pat. No. 5,749,930 is they require a greater vertical height than the triangular design discussed above. Another disadvantage common to the embodiments in which the apex of either stage points in the direction opposite the vapor flow direction is the liquid drains toward the apex into the middle of the vapor stream where it is more likely to become reentrained in the vapor stream. In addition, in the embodiment in which the apexes point away from each other, liquid that drains from the overlying downstream stage onto the underlying upstream stage will then drain toward the apex of the upstream stage, thereby further reducing the capacity and efficiency of the upstream stage. This embodiment, however, has an advantage in that the lateral sides of the two stages are positioned closely together and are supported on a common pair of beams. The lateral sides of the two stages in the other embodiments are positioned a greater distance apart and are shown as being supported on separate support structures.

A three-stage mist eliminator is disclosed in German Patent Publication No. 20 2005 002 674 U1 and uses a bank of rods as the first stage and blades in the second and third stages. The blades in the second and third stages differ in type and are arranged in a triangular configuration. Because the second stage extends linearly, it suffers the same drainage problems of the triangular designs discussed above. The use of three stages is also disadvantageous because it increases the height of the mist eliminator in comparison to the two-stage mist eliminators discussed above.

A need thus exists for a two-stage mist eliminator in which the two stages are supported on a common support structure and in which the capacity and efficiency of the upstream stage is improved over the designs described above in which the upstream stage is linear or has an apex pointing in the opposite direction of the vapor stream flow.

SUMMARY OF THE INVENTION

In one embodiment of the present invention, there is provided a mist eliminator comprising an upstream mist elimination unit, a downstream mist elimination unit, and a central longitudinal axis defined therebetween. The upstream and downstream mist elimination units each comprise sloped wing segments. The sloped wing segments extend outwardly from the central longitudinal axis in a generally opposite, generally downward direction. As a result the upstream and downstream mist elimination units present an inverted V-shaped profile. The upstream pair of sloped wing segments defines a first included angle, $\alpha_1$, and the downstream pair of sloped wing segments defines a second included angle, $\alpha_2$. The ratio of $\alpha_2:\alpha_1$ is less than 1.

Both the upstream and downstream mist elimination units comprise a plurality of impingement blades configured in a side-by-side and parallel-extending configuration. The adjacent blades in the upstream mist elimination unit are spaced from each other by a first distance, $x_1$, and the adjacent blades in the downstream mist elimination unit are spaced from each other by a second distance $x_2$. In one embodiment, $x_1$ is preferably greater than $x_2$. In other embodiments, $x_1$ is less than, or can equal $x_2$.

In another embodiment of the present invention, a process is provided for separating liquid from a liquid-containing vapor stream using the mist eliminator described above.

Advantageously, one or more of the above-described pairs of mist elimination units can be contained within a vessel. In one embodiment, the mist elimination units can be oriented in a side-by-side linear relationship to cover at least a portion of the cross-sectional flow area of the vessel.

DETAILED DESCRIPTION

Figure 1:
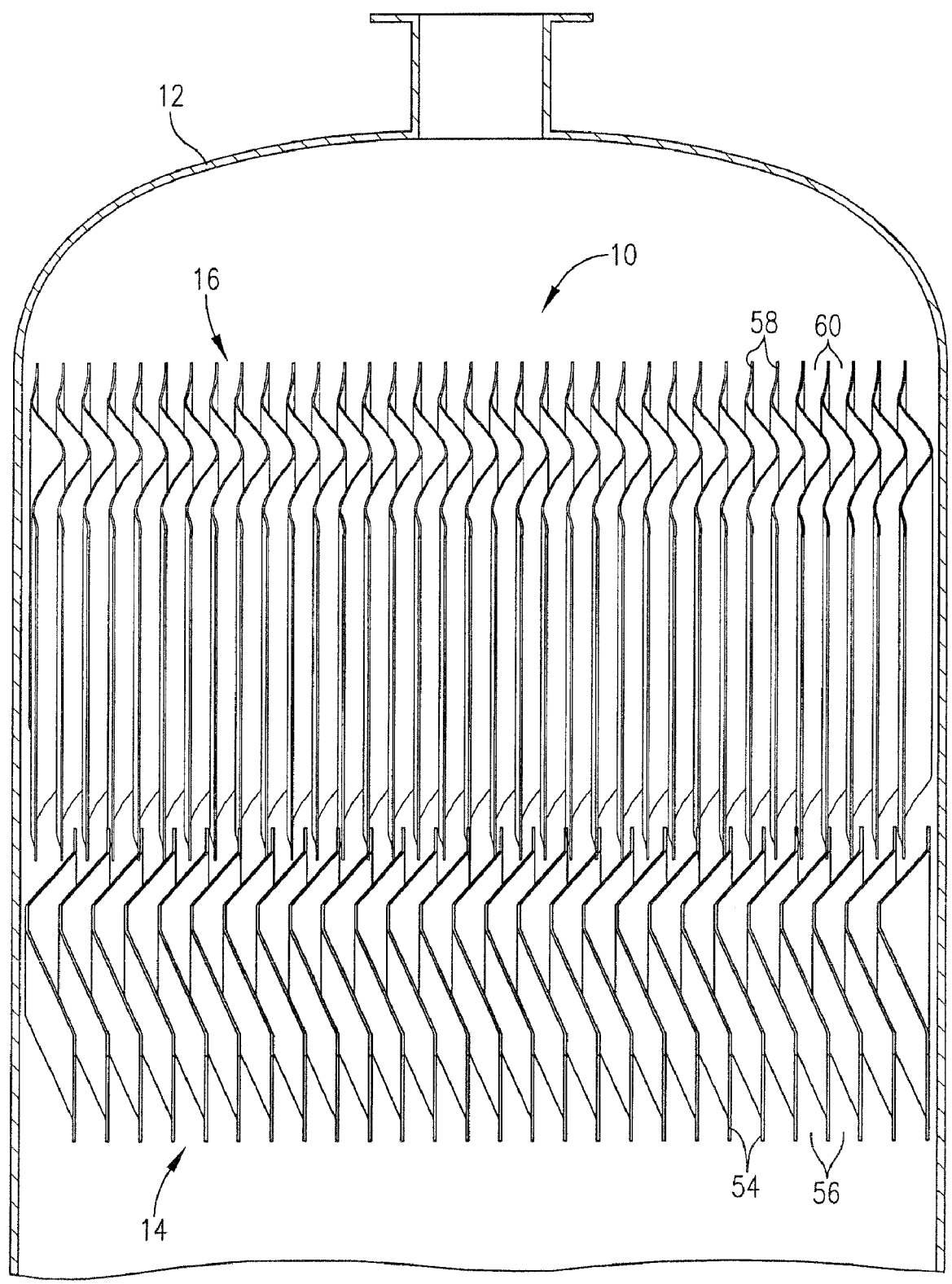
FIG. 1 is a fragmentary elevational view of a vessel taken in vertical section and containing a mist eliminator of the present invention shown somewhat schematically.

Turning now to the drawings in greater detail and initially to FIG. 1, a mist eliminator constructed in accordance with one embodiment of the present invention is designated generally by the numeral 10. Mist eliminator 10 is positioned in the flow path of a vapor stream flowing within a vessel 12 and is operable to separate suspended or entrained liquid droplets from the flowing vapor stream. The vessel 12 can be a distillation column, knockout drum, evaporator, environmental scrubber, conduit, or other process apparatus through which the vapor stream flows.

Figure 2:
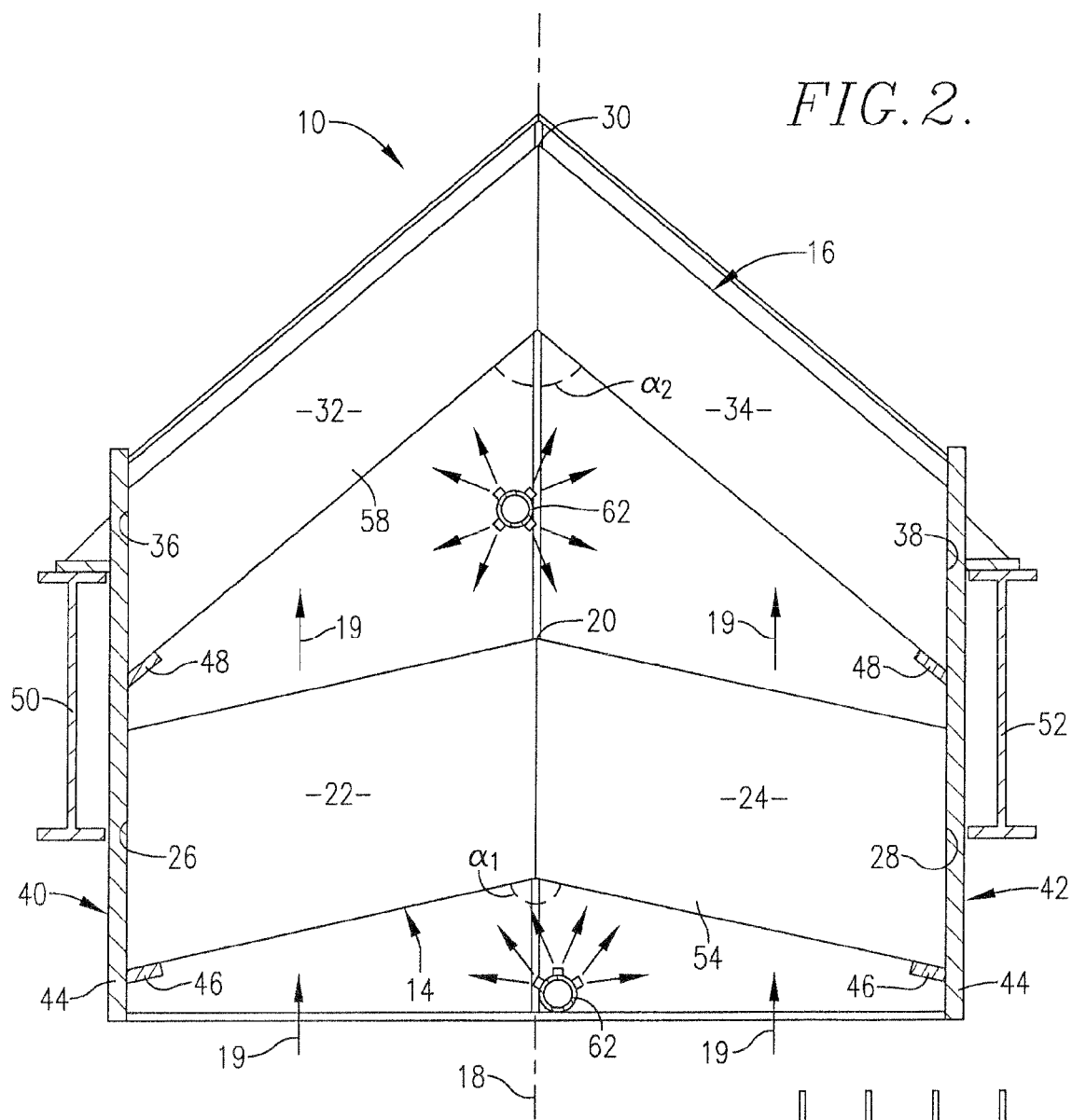
FIG. 2 is a schematic side view of a mist eliminator according to one embodiment of the present invention.

Turning now additionally to FIG. 2, the mist eliminator comprises one or more pairs of a first or upstream unit 14 and a second or downstream unit 16. The paired units 14 and 16 are generally aligned along a central longitudinal axis 18 in the direction of flow of the vapor stream, represented by arrows 19. Central axis 18 is normally oriented substantially vertically, but can be inclined at an angle to the vertical. If more than one pair of mist elimination units 14 and 16 is used, the first units 14 are positioned in linear or offset side-by-side relationship and the second units 16 are likewise positioned in linear or offset side-by-side relationship. Substantially all of the entire cross-sectional area of the vessel 12 (FIG. 1) is preferably filled by both the first unit(s) 14 and the second unit(s) 16.

The first mist elimination unit 14 has a generally vaulted or inverted V-shaped profile. The unit 14 has a central apex 20 and a pair of wing segments 22 and 24 that slope outwardly and downwardly from the apex 20 and are positioned in intersecting planes. The wing segments 22 and 24 terminate in laterally spaced-apart terminal ends 26 and 28, respectively.

The second mist elimination unit 16 also has a generally vaulted or inverted V-shaped profile with a central apex 30 and outwardly and downwardly sloping wing segments 32 and 34 having terminal ends 36 and 38. The apex 20 and terminal ends 26 and 28 of the first unit 14 are preferably, but not necessarily, generally aligned with the respective apex 30 and terminal ends 36 and 38 of the second unit 16.

The wing segments 22, 24, 32, and 34 are depicted as parallelograms in the drawings, but it is to be understood that they can be other geometric shapes. Likewise, the use of the phrase "inverted V-shaped profile" herein is not intended to require that the wing segments extend in a linear fashion. They may instead extend in an arcuate or curvilinear fashion from the central apex 20 or 30 to the respective terminal ends 26 and 28 or 36 and 38.

The terminal ends 26 and 28 of the first mist elimination unit 14 are attached to a first support member 40 and a second support member 42, respectively, that extend along the horizontal length of the terminal ends 26 and 28. The terminal ends 36 and 38 of the second mist elimination unit are likewise attached to the same support members 40 and 42. In one embodiment, the support members 40 and 42 may each take the form of a flat metal or plastic plate 44 having inwardly projecting flanges 46 and 48 that underlie and support the wing segments 22, 24, 32, and 34 of the respective mist elimination units 14 and 16. The ends of the support members 40 and 42 may be welded or otherwise attached directly to the walls of the vessel 12 (FIG. 1) or they may be attached to beams 50 and 52 that are attached to the walls of the vessel 12. The particular configuration of the support members 40 and 42 can be varied to suit particular applications, but it is preferred that a single set of support members 40 and 42 is used to support the paired first and second mist elimination units 14 and 16. Utilizing a single set of support members 40 and 42 for both the first and second mist elimination units 14 and 16 rather than separate support members for each unit 14 and 16 is advantageous in that it minimizes the fabrication and installation costs of the mist eliminator 10.

The inverted V-shaped profile of the first unit 14 defines an included angle $\alpha_1$ between the wing segments 22 and 24. The wing segments 32 and 34 of the second unit 16 likewise define an included angle $\alpha_2$. The included angle $\alpha_1$ of the first unit 14 is preferably greater than included angle $\alpha_2$ of the second unit 16 so that the ratio of $\alpha_2:\alpha_1$ is less than 1 or is in the range of from about 0.1 to about 0.8, about 0.25 to about 0.8, or 0.4 to 0.6. Generally, included angle $\alpha_1$ can be in the range of from about 120° to about 175°, about 130° to about 170°, or 150° to 160°. Included angle $\alpha_2$ can be in the range of from about 50° to about 160°, about 60° to about 140°, or 80° to 120°. As a result of this difference in the included angles, the inverted V-shaped profile of the first unit 14 differs from that of the second unit 16.

Because included angle $\alpha_1$ is greater than included angle $\alpha_2$, the terminal ends 26 and 28 of the first unit 14 can be positioned closely to the terminal ends 36 and 38, respectively, of the second unit 16, thereby allowing both units 14 and 16 to be supported by the common pair of support members 40 and 42. Although the terminal ends of the units 14 and 16 are closely spaced, the difference in included angles $\alpha_1$ and $\alpha_2$ allows greater spacing between the central apexes 20 and 30 of the units. The open space between the units 14 and 16 is advantageous in that it permits a more uniform velocity profile to be obtained as the vapor stream ascends from the first unit 14 to the second unit 16. This advantage is obtained even though the overall height of the mist eliminator 10 is comparable to existing mist eliminators having a triangular design. Moreover, because the first unit 14 has an inverted V-shaped profile which facilitates liquid drainage, the mist eliminator 10 can have a greater efficiency and capacity in comparison to those existing mist eliminators.

Figure 3B:
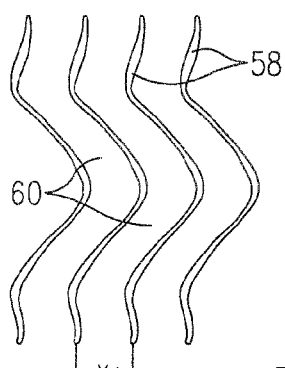
FIG. 3b is a schematic side view of adjacent impingement blades used in the second stage of the mist eliminator.
Figure 3A:
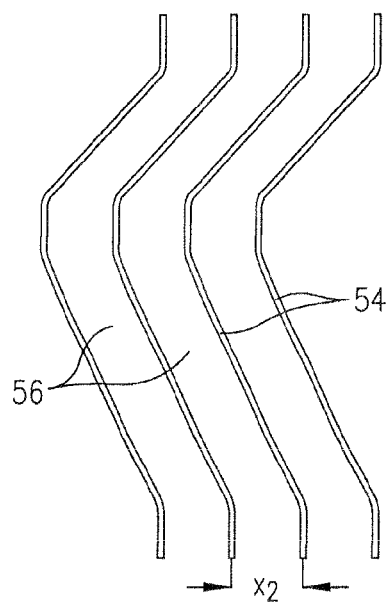
FIG. 3a is a schematic side view of adjacent impingement blades used in the first stage of the mist eliminator.

Turning additionally to FIG. 3a, the mist elimination unit 14 comprises a plurality of impingement blades 54 that are arranged in side-by-side and parallel relationship. Each blade 54 in unit 14 is spaced apart from adjacent blades 54 to form vapor stream flow passages 56 in the open spacing between the blades 54. The spacing between adjacent blades 54 is normally a uniform distance $x_2$. Alternatively, the spacing can be varied to create passages 56 of different widths, such as when preferential flow of the vapor stream through specific regions of the mist elimination unit 14 is desired.

In a similar manner, the mist elimination unit 16 comprises a plurality of side-by-side and parallel-extending impingement blades 58 that are spaced apart to create vapor stream passages 60. The blades 58 in the second unit 16 can be spaced apart a uniform distance $x_1$ or the spacing may be varied to cause preferential flow of the vapor stream through different regions of the second unit 16. The blades 54 and 58 can be made of various materials such as metals, metal alloys, polymers, fiber-reinforced plastics, and ceramics. Among the specific examples of suitable materials are stainless steel, carbon steel, titanium, polypropylene, polyvinylidene fluoride (PVDF), and polysulfone.

The impingement blades 54 in the first mist elimination unit 14 may be the same as, or more preferably are different from, the impingement blades 58 in the second mist elimination unit 16. Both sets of blades 54 and 58 preferably have a number of reverse bends that cause multiple changes in direction of the vapor flow passages 56 and 60. As the vapor stream navigates these directional changes in the passages 56 and 58, the inertia or momentum of the liquid droplets causes the droplets to impinge upon the surface of the blades 54 and 58. The droplets then coalesce into larger droplets and drain under the influence of gravity. The draining liquid tends to follow the bends in the blades 54 and 58 in a downward and outward direction toward the terminal ends 26, 28, 36, and 38 of the respective wing segments 22, 24, 32, and 34. In general, the exact spacing of adjacent impingement blades 54 and 58 can be determined by the specific application, but typically, $x_1$ and/or $x_2$ can be in the range of from about 0.25 to about 3.5 inches or about 0.5 to about 3.0 inches.

The difference in the impingement blades 54 and 58 may be limited to a difference in the spacing between the blades. In one embodiment, the blades 54 of first mist elimination unit 14 are spaced further apart than the impingement blades 58 of the second mist elimination unit 16 such that the ratio of $x_1:x_2$ is in the range of from about 0.1 to about 0.9, about 0.25 to about 0.75, or 0.3 to 0.65. This relatively greater spacing between the blades 54 allows the first unit 14 to accommodate a heavier liquid load with a reduced risk of flooding.

Another difference in the blades 54 and 58 may be in their relative heights and/or configurations. For example, the blades 54 in first unit 14 may be taller or have a higher profile in comparison to blades 58 in second unit 16 to allow for greater liquid collection in the first unit 14 than in the second unit 16. In one embodiment, the blades 54 and 58 can independently have a height along their short dimension of anywhere between approximately 5 to 15 inches. The configuration of the blades 54 may differ from blades 58 in the number of bends or "passes" and/or the angles of the bends form in the blades. Examples of suitable impingement blade designs are described in U.S. Pat. Nos. 5,269,823 and 5,464,459, the disclosures of which are incorporated herein by reference.

The mist eliminator 10 normally includes one or more spray headers 62 positioned to intermittently emit a spray of liquid, such as water, onto the mist elimination units 14 and 16 to remove debris from the surfaces of the blades 54 and 58. The spray headers 62 can be mechanically supported in any suitable fashion.

In operation, a liquid droplet-containing vapor stream enters mist eliminator 10 through the inlet side of first mist elimination unit 14, as illustrated in FIG. 2. As the vapor navigates the plurality of vapor flow passageways 56 defined between adjacent impingement blades 54 (FIG. 3a) in the first unit 14, at least a portion of the liquid droplets suspended or entrained in the vapor stream impacts, coalesces on, and subsequently drains downwardly along the blades toward support members 40 and 42.

As shown in FIG. 2, the vapor stream exiting first mist elimination unit 14 then enters the inlet side of second mist elimination unit 16, wherein at least a portion of the remaining liquid droplets are removed in a similar manner as the droplets impinge upon the blades 58 (FIG. 3b). Together, the blades 54 and 58 are configured so that the desired separation efficiency and/or capacity of the mist eliminator 10 is obtained for the particular application. As used herein, the term "separation efficiency" is defined as the difference between the total volume of liquid particles entering and exiting mist eliminator 10, divided by the total volume of liquid particles in entering mist eliminator 10, expressed as a percentage.

According to one embodiment of the present invention, the above-described configuration allows mist eliminator 10 to efficiently process vapor streams having a high superficial velocity while maintaining a relatively low fractional reentrainment of liquid particles.

The following example illustrates the ability of embodiments of the mist eliminator 10 of the present invention to process gas streams having high superficial velocities while maintaining relatively low fractional entrainment of the coalesced liquid particles and is not intended to limit the scope of the invention in any way.

Example

The separation efficiency and capacity of six different vertically-oriented mist elimination configurations were tested using the same test apparatus and the same vapor stream composition or "challenge spray." Comparative Mist Eliminators A-D were arranged in a general triangular configuration with a flat lower stage and a peaked upper stage with an included angle ($\alpha_2$) for the upstream unit of 90°. Inventive Mist Eliminators E and F were arranged in the configuration generally illustrated in FIG. 2 with an included angle ($\alpha_1$) of 158° for the first mist elimination unit 14 and an included angle ($\alpha_2$) of 90° for the second unit 16. Impingement blades of various profiles (i.e., heights), capacities, and efficiencies were employed in Mist Eliminators A-F. Table 1, below, summarizes the various configurations.

TABLE 1

| | | Type of Impingement Blade | |
|---|---|---|---|
| Mist Eliminator | | Lower Stage | Upper Stage |
| A | Comparative | Low profile | Low profile |
| B | Comparative | High capacity | Low profile |
| C | Comparative | High capacity | Low profile |
| D | Comparative | High capacity | High efficiency |
| E | Inventive | High capacity | Medium efficiency |
| F | Inventive | High capacity | High efficiency |

Figure 4:
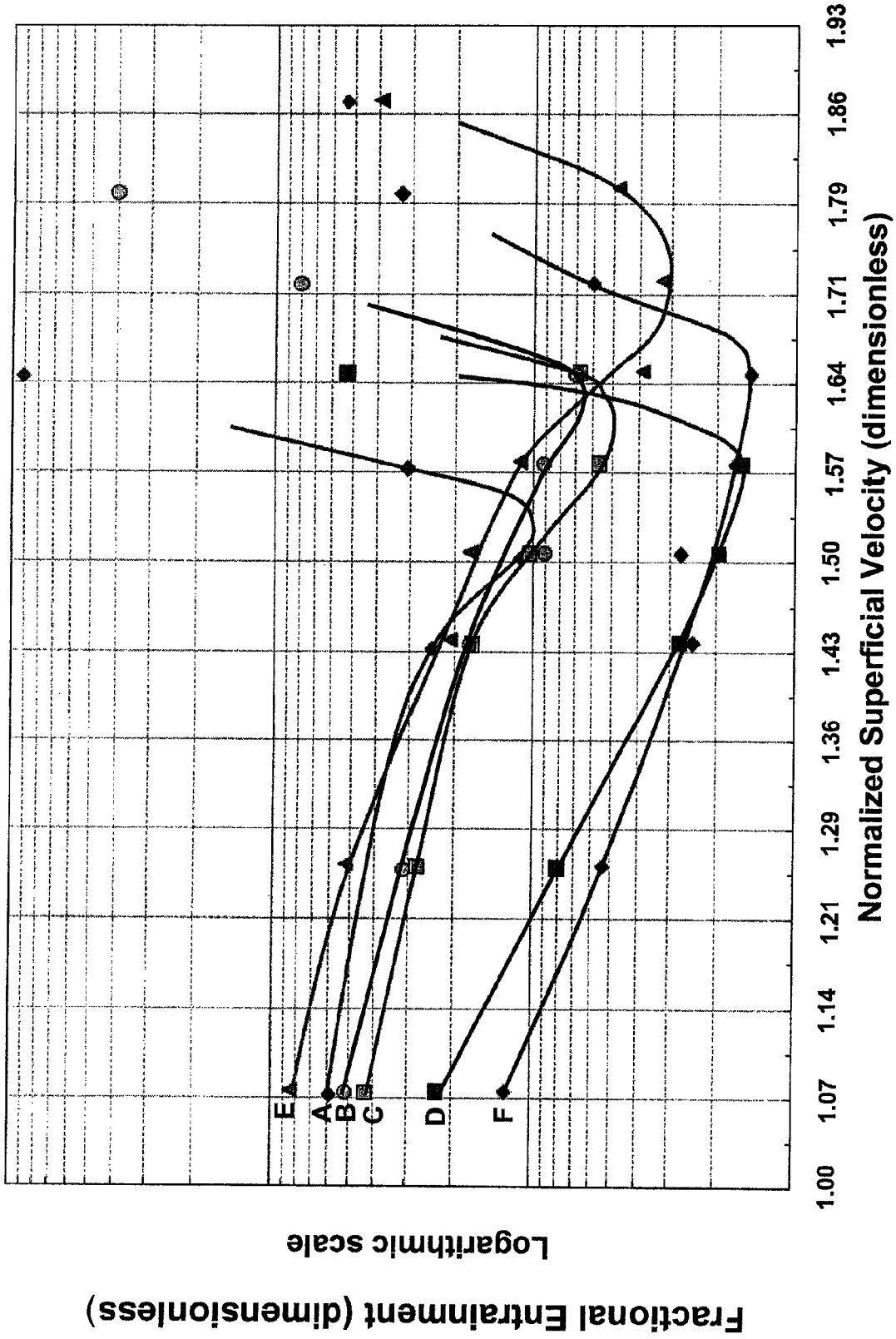
FIG. 4 is a fractional entrainment versus superficial velocity plot comparing the relative performance of several comparative and inventive mist eliminators.

Comparative Mist Eliminators A-D and Inventive Mist Eliminators E and F were subjected to an ascending vapor stream having a large concentration of small liquid droplets. The superficial velocity of the vapor stream was increased and the resulting change in fractional entrainment was determined. FIG. 4 presents a graphical representation of the results for Mist Eliminators A-F with dimensionless fractional entrainment plotted against normalized and dimensionless superficial velocity. In addition, the "normalized maximum superficial velocity" (i.e., the normalized velocity at which the fractional entrainment spiked dramatically) for each mist eliminator was recorded and the results are summarized in Table 2, below.

TABLE 2

| Mist Eliminator | | Normalized Maximum Superficial Velocity (dimensionless) |
|---|---|---|
| A | Comparative | 1.56 |
| B | Comparative | 1.66 |
| C | Comparative | 1.66 |
| D | Comparative | 1.61 |
| E | Inventive | 1.79 |
| F | Inventive | 1.68 |

As illustrated in FIG. 4, Inventive Mist Eliminator F was designed so that it generally had lower fractional entrainment values for a given superficial velocity, as compared to Comparative Mist Eliminators A-D. Mist Eliminator E was designed so that it generally had a higher capacity than the Comparative Mist Eliminators A-D. Further, as shown in Table 2, Inventive Mist Eliminators E and F were able to effectively process gas streams having higher superficial velocities, as evidenced by the higher maximum superficial velocities.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A mist elimination system comprising:
   an upstream mist elimination unit;
   a downstream mist elimination unit; and
   a central longitudinal axis generally defined therebetween,
   wherein said upstream mist elimination unit comprises an upstream pair of sloped wing segments and said downstream mist elimination unit comprises a downstream pair of sloped wing segments, wherein each pair of sloped wing segments extends outwardly from said central longitudinal axis in a generally opposite, generally downward direction to thereby create an inverted generally V-shaped profile for each of said upstream and downstream mist elimination units, and
   wherein a first included angle $\alpha_1$ is defined between said upstream pair of sloped wing segments, a second included angle $\alpha_2$ is defined between said downstream pair of sloped wing segments, and the ratio of said second included angle to said first included angle $\alpha_2:\alpha_1$ is less than 1.

2. The mist elimination system of claim 1, wherein the upstream pair of sloped wing segments define a pair of first and second upstream terminal ends and the downstream pair of sloped wing segments define a pair of first and second downstream terminal ends, wherein said first upstream and said first downstream terminal ends are supported on a first common support, wherein said second upstream and second downstream terminal ends are supported on a second common support.

3. The mist elimination system of claim 1, wherein said upstream and said downstream sloped wing segments extend outwardly and downwardly from said central longitudinal axis in a generally linear fashion.

4. The mist elimination system of claim 1, wherein the ratio of $\alpha_2:\alpha_1$ is in the range of from about 0.1 to about 0.8.

5. The mist elimination system of claim 1, wherein $\alpha_1$ is in the range of from about 120° to about 175° and $\alpha_2$ is in the range of from about 50° to about 160°.

6. The mist elimination system of claim 1, wherein said central longitudinal axis is oriented substantially vertically.

7. A vessel containing a mist elimination system of claim 1.

8. The mist elimination system of claim 1, wherein said upstream pair of sloped wing units comprises a plurality of upstream impingement blades and said downstream pair of sloped wing units comprises a plurality of downstream impingement blades, each of said upstream and downstream impingement blades being positioned in a side-by-side and parallel-extending configuration.

9. The mist elimination system of claim 8, wherein the height of said upstream and downstream impingement blades along their short dimension is in the range of from about 5 to about 15 inches.

10. The mist elimination system of claim 8, wherein said adjacent ones of said upstream blades are spaced from each other by a first distance $x_1$ and said adjacent ones of said downstream blades are spaced from each other by a second distance $x_2$, wherein the ratio of $x_2:x_1$ is less than 1.

11. The mist elimination system of claim 8, wherein said upstream impingement blades along their short dimension are taller than said downstream impingement blades along their short dimension.

12. The mist elimination system of claim 8, wherein each of said upstream impingement blades is spaced apart from adjacent upstream impingement blades to form vapor stream flow passages in an open spacing between said adjacent upstream impingement blades and wherein said open spacing between some of said adjacent upstream impingement blades is varied from said open spacing between others of said adjacent upstream impingement blades.

13. A process for separating liquid from a liquid-containing vapor stream, said process comprising:
   (a) introducing said liquid-containing vapor stream into a vessel;
   (b) passing at least a portion of said liquid-containing vapor stream introduced into said vessel through an upstream mist elimination unit comprising an upstream pair of sloped wing segments which extend outwardly and downward and define a first included angle $\alpha_1$ to thereby provide a first separated liquid phase and a first liquid-depleted vapor stream; and
   (c) passing at least a portion of said first liquid-depleted vapor stream through a downstream mist elimination unit comprising an upstream pair of sloped wing segments which extend outwardly and downward and define a second included angle $\alpha_2$ to thereby provide a second separated liquid phase and a second liquid-depleted stream, the ratio of said second included angle to said first included angle $\alpha_2:\alpha_1$ being less than 1.

14. The process of claim 13, including supporting said upstream and downstream mist elimination units on a common pair of supports.

15. The process of claim 13, wherein at least a portion of said first and said second separated liquid phases drains downwardly and outwardly toward a wall of said vessel.

16. The process of claim 13, including aligning said upstream and downstream mist elimination units along a central longitudinal axis which is generally oriented along the flow path of said liquid-containing vapor stream.

17. The process of claim 16, wherein $\alpha_1$ is in the range of from about 120° to about 175° and $\alpha_2$ is in the range of from about 50° to about 160°.

18. A mist elimination system for removing liquid from a liquid-containing vapor stream passing therethrough, said mist elimination system comprising:
- an upstream mist elimination unit, a downstream mist elimination unit, and a central longitudinal axis generally defined therebetween,
- wherein said upstream mist elimination unit comprises an upstream pair of sloped wing segments, said downstream mist elimination unit comprises a downstream pair of sloped wing segments, and each pair of sloped wing segments extends outwardly from said central longitudinal axis in a generally opposite, generally downward direction to thereby create an inverted generally V-shaped profile for each of said upstream and downstream mist elimination units,
- wherein a first included angle $\alpha_1$ is defined between said upstream pair of sloped wing segments, a second included angle $\alpha_2$ is defined between said downstream pair of sloped wing segments, the ratio of $\alpha_2:\alpha_1$ is in the range of from about 0.1 to about 0.8, $\alpha_1$ is in the range of from about 120° to about 175°, and $\alpha_2$ is in the range of from about 50° to about 160°, and
- wherein said upstream pair of sloped wing units comprises a plurality of upstream impingement blades and said downstream pair of sloped wing units comprises a plurality of downstream impingement blades, each of said upstream and downstream impingement blades being positioned in a side-by-side and parallel-extending configuration.

19. The mist elimination system of claim 18, wherein the upstream pair of sloped wing segments define a pair of first and second upstream terminal ends and the downstream pair of sloped wing segments define a pair of first and second downstream terminal ends, wherein said first upstream and said first downstream terminal ends are supported on a first common support, wherein said second upstream and second downstream terminal ends are supported on a second common support.

20. The mist elimination system of claim 18, wherein said adjacent ones of said upstream blades are spaced from each other by a first distance $x_1$ and said adjacent ones of said downstream blades are spaced from each other by a second distance $x_2$, wherein the ratio of $x_2:x_1$ is less than 1.

* * * * *